United States Patent [19]

Krapcho et al.

[11] 3,897,420

[45] July 29, 1975

[54] 2-AMINOALKYL-7-SUBSTITUTED-3,3A,4,5,6,7-HEXAHYDRO-3-SUBSTITUTED-2H-PYRAZOLO[4,3-C]PYRIDINES

[75] Inventors: John Krapcho, Somerset; Chester F. Turk, Kendall Park, both of N.J.

[73] Assignee: E. R. Squibb & Sons, Inc., Princeton, N.J.

[22] Filed: June 17, 1974

[21] Appl. No.: 479,928

Related U.S. Application Data

[63] Continuation-in-part of Ser. No. 374,722, June 28, 1973, abandoned.

[52] U.S. Cl. ...... 260/240 F; 260/240 R; 260/240.7; 424/263; 260/295.5 B; 260/250 R
[51] Int. Cl. ..................... C09b 23/00; C09b 23/04
[58] Field of Search ... 260/240 F, 250 BC, 295.5 B, 260/260, 240.7, 240 R

[56] References Cited
UNITED STATES PATENTS
3,669,950  6/1972  Hoehn et al. ............. 260/295.5 B X

OTHER PUBLICATIONS

Schenone et al., Farmaco, Ed. Sci. 1971, pp. 857–867; Abs. in Chem. Abs., Vol. 76, No. 34073k, (1972).

Nair et al., Indian J. Chem. 1967, pp. 464–466; Abs. in Chem. Abstracts, Vol. 69, No. 27383p, (1968).

Primary Examiner—Allen B. Curtis
Attorney, Agent, or Firm—Lawrence S. Levinson; Merle J. Smith; Stephen B. Davis

[57] ABSTRACT

2-Aminoalkyl-7-substituted-3,3a,4,5,6,7-hexahydro-3-substituted-2H-pyrazolo[4,3-c]pyridines and their N-oxides and the acid addition salts thereof are reported. In addition, methods for preparing said compounds, pharmaceutical compositions containing said compounds and methods for using said compositions as central nervous system depressants are disclosed.

6 Claims, No Drawings

2-AMINOALKYL-7-SUBSTITUTED-3,3A,4,5,6,7-HEXAHYDRO-3-SUBSTITUTED-2H-PYRAZOLO(4,3-C)PYRIDINES

This application is a continuation-in-part of application Ser. No. 374,722, filed June 28, 1973, now abandoned.

This invention relates to compounds of the formula:

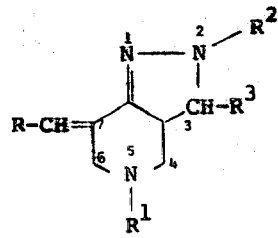

wherein R and $R^3$ are

or

X and $X^1$ are hydrogen, chloro, fluoro, lower alkyl, lower alkoxy or trifluoromethyl; $R^1$ is hydrogen, lower alkyl,

lower alkyl, hydroxy lower alkyl or lower alkanoyl; $R^2$ is B- lower alkyl wherein B is di-lower alkylamino, lower alkyl amino, piperidino, pyrrolidino, morpholino, N-lower alkyl piperazino and N-(2-hydroxyethyl)piperazino; and N-oxides and the acid addition salts thereof.

In addition, this invention encompasses the methods for preparing said compounds, pharmaceutical compositions containing said compounds and methods for using said compositions as central nervous system depressants.

The term "lower alkyl" is intended to mean a straight or branched hydrocarbon fragment of from one to eight carbon atoms.

The term "lower alkoxy" is intended to mean "lower alkyl-O—".

The term "lower alkanoyl" is intended to mean "lower alkyl

".

The term "acid addition salts" is intended to mean salts which may be formed for the purpose of isolation, purification and storage, such as the oxalate salt, etc., and pharmaceutically acceptable salts meant for administration of the compound to a host, such as the hydrochloride, sulfate, acetate, citrate, etc.

The compounds of this invention are prepared in the following manner. Compounds of the formula II

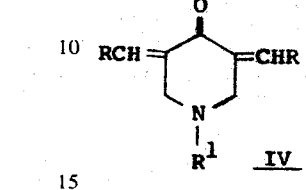
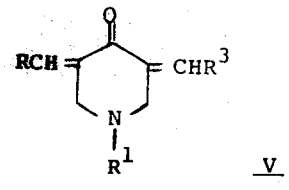

wherein $R^1$ is as previously defined, are reacted with compounds of the formula RCHO, wherein R is as previously defined utilizing the reaction procedure described in The Journal of the American Chemical Society, 70, 1824 (1948), which is incorporated by reference, to give compounds of the formula IV. By adjusting the ratio of reactants so as to have an excess of the compound of formula II present, compounds of formula III are prepared.

Compounds of the formula V are prepared by reacting compounds of the formula III with an aldehyde of the formula $R^3$CHO, wherein $R^3$ is as previously described, in the manner described in The Journal of the American Chemical Society, 70, 1824 (1948).

The compounds of the formulae IV and V are generally isolated in the form of their acid-addition salts.

The compounds of the formulae IV and V, preferably in the form of their salts, such as the hydrochloride salt, sulfate salt, phosphate salt, etc., are converted to a compound of the formula I by reaction with a hydrazine of the formula $H_2NNHR^2$, wherein $R^2$ is as previously defined in an organic solvent, preferably an alcohol of up to four carbon atoms at temperatures of from about 40°C to about 120°C, preferably at about the reflux temperature of the solvent, for from about one-half hour to about 12 hours, preferably 4 hours. Alternately, the compound of this invention may be prepared by heating the appropriate hydroxy lower alkyl compound with p-toluenesulfonyl chloride and then reacting the resulting tosylate with the appropriate amine, i.e.,

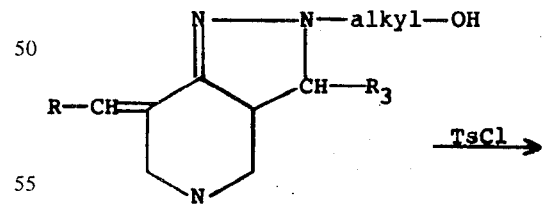

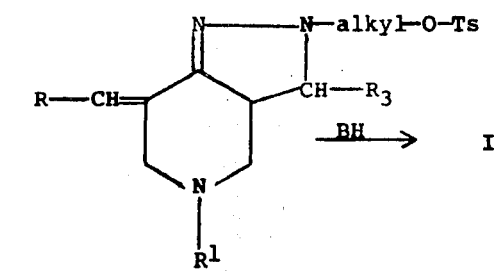

The hydroxy lower alkyl compounds are disclosed in Ser. No. 340,408 filed Mar. 12, 1973, now U.S. Pat. No. 3,852,279.

The preferred compounds prepared by these procedures are those wherein R and $R^3$ are phenyl, X is hydrogen, $R^1$ is lower alkyl or hydrogen and $R^2$ is 3-dialkylaminopropyl.

The 2-amino-lower alkyl-7-substituted-3,3a,4,5,6,7-hexahydro-3-substituted-2H-pyrazolo[4,3-c]pyridines, their N-oxides and their non-toxic pharmaceutically acceptable mono- or di-acid addition salts are useful as central nervous system depressants in mammals when administered in amounts ranging from about 0.5 mg to about 10.0 mg per kg of body weight per day. A preferred dosage regimen for optimum results would be from about 1 mg to about 5 mg per kg of body weight per day, and such dosage units are employed that a total of from about 35 mg to about 7 g of active ingredient for a subject of about 70 kg body weight are administered in a 24 hour period.

The compounds of the present invention in the described dosages are intended to be administered orally; however, other routes, such as rectally, intraperitoneally, subcutaneously, intramuscularly or intravenously may be employed.

The active compounds of the present invention are orally administered, for example, with an inert diluent or with an assimilable edible carrier, or they may be enclosed in hard or soft gelatin capsules, or they may be compressed into tablets, or they may be incorporated directly with the food of the diet. For oral therapeutic administration, the active compounds of this invention may be incorporated with excipients and used in the form of tablets, troches, capsules, elixirs, suspensions, syrups, wafers, chewing gum, and the like. Such compositions and preparations should contain at least 0.1% of active compound. The percentage in the compositions and preparations may, of course, be varied and may conveniently be between about 5% to about 75% or more of the weight of the unit. The amount of active compound in such therapeutically useful compositions or preparations is such that a suitable dosage will be obtained. Preferred compositions or preparations according to the present invention are prepared so that an oral dosage unit form contains between about 2 and 500 milligrams of active compound, preferably between 2 and 25 mg.

The tablets, troches, pills, capsules and the like may also contain the following: a binder such as gum tragacanth, acacia, corn starch or gelatin; an excipient such as dicalcium phosphate; a disintegrating agent such as corn starch, potato starch, aliginic acid and the like; a lubricant such as magnesium stearate; and a sweetening agent such as sucrose, lactose or saccharin may be added or a flavoring agent such as peppermint, oil of wintergreen, or cherry flavoring. When the dosage unit form is capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar or both. A syrup or elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and substantially non-toxic in the amounts employed.

The following examples are provided for illustrative purposes and may include particular features of the invention; however, the examples should not be construed as limiting the invention, many variations of which are possible without departing from the spirit or scope thereof.

EXAMPLE 1

7-Benzylidene-2-[3-(dimethylamino)propyl]-3,3a,4,5,-6,7-hexahydro-5-methyl-3-phenyl-2H-pyrazolo[4,3-c]pyridine, hydrochloride (1:2)

A. 3,5-Dibenzylidene-1-methyl-4-piperidone, hydrochloride

A solution of 57.0 g (0.5 mole) of 1-methyl-4-piperidone and 106.0 g (1.0 mole) of benzaldehyde in 400 ml of ethanol is cooled in an ice bath and treated with HCl gas until 250 g is absorbed. The red-colored solution is allowed to stand at room temperature overnight. The resulting deep red-brown solution is seeded, allowed to stand overnight at room temperature, and the crystalline solid is filtered on a sintered-glass funnel and washed with cold ethanol, followed by ether. After drying in a desiccator, the solid (146 g) is digested in 400 ml of hot ethanol (75°), cooled and filtered to give 120 g (74%) of pale yellow product, m.p. 242°–244°(dec).

Recrystallization of 11 g of this material from 35 ml of dimethylformamide (DMF) gives 9.2 g of product, m.p. 242°–244°(dec).

B. 7-Benzylidene-2-[3-(dimethylamino)propyl]-3,3a,-4,5,6,7-hexahydro-5-methyl-3-phenyl-2H-pyrazolo[4,3-c]pyridine, hydrochloride (1:2)

Ten grams (0.031 mole) of 3,5-dibenzylidene-1-methyl-4-piperidone HCl is reacted with 3.8 g (0.032 mole) of 3-dimethylaminopropylhydrazine [See Nogrady & Morris, Can. J. Chem., 47, 2001 (1969); bp 80°–85°/10 mm] in 100 ml of MeOH and refluxed for 4 hours. Evaporation of the MeOH left 14 g of a yellow foamy residue. This is suspended in 100 ml of MeOH, layered over with 100 ml of ether, stirred, basified with $K_2CO_3$, the layers separated, the aqueous phase extracted with ether, the combined ether layers dried ($MgSO_4$), and the solvent evaporated to give 11.5 g of viscous base.

A solution of the base in 60 ml of warm MeCN is treated with a warm solution of 7.8 g of oxalic acid in 60 ml of MeCN. The oxalate separated as an oil which slowly became crystalline on rubbing, standing at room temperature, and finally cooling; wt., 16.5 g; m.p. 170°–172° (foaming). Crystallization from 50 ml hot DMF-150 ml MeCN gave 13.6 g of a pale yellow solid; m.p. 148°–151°(foaming); s. 115°.

The dioxalate is converted to the base as above and the latter (8.4 g) is dissolved in 80 ml of MeCN, cooled, treated with 7 ml of 6.2 N alcholic HCl, and poured into 500 ml of stirred ether to precipitate the solid 2 HCl salt. The latter is filtered under $N_2$, washed with ether, and dried in vacuo; wt., 9.2 g; m.p. 159°–161°(foaming); s. 135°. Following crystallization from a boiling mixture of 50 ml of MeCN and 50 ml of EtOAc gave 7.7 g of pale yellow solid; m.p. 174°–176°(dec).

EXAMPLE 2

7-Benzylidene-2-[3-(dimethylamino)propyl]-
3,3a,4,5,6,7-hexahydro-3-phenyl-2H-pyrazolo[4,3-
c]pyridine, hydrochloride (1:2)

A. 3,5-Dibenzylidene-4-piperidone, hydrochloride

14 Grams (0.1 mole) of N-acetyl-4-piperidone and 32 g (0.3 mole) of benzaldehyde are reacted in 150 ml of EtOH containing 33 ml of concentrated HCl. A solid separates after approximately 45 minutes of refluxing. Refluxing is continued for a total of 6 hours, and the mixture is kept overnight at room temperature.

The light yellow solid is filtered, washed with EtOH, then with ether, and air-dried; weight 26 g; m.p. 273°–275° (dec).

B. 7-Benzylidene-2-[3-(dimethylamino)propyl]-
3,3a,4,5,6,7-hexahydro-3-phenyl-2H-pyrazolo[4,3-
c]pyridine, hydrochloride (1:2)

A mixture of 9.6 g (0.031 mole) of the material from Part A, 3.8 g (0.032 mole) of 3-dimethylaminopropyl hydrazine and 100 ml of methanol is reacted in the same manner as in Example 1 to give 16.7 g of the oxalic acid salt, mp 149°–152°. After crystallization from 50 ml of dimethylformamide-100 ml of acetonitrile, the light yellow solid weighed 13.5 g., mp 165°–167° (s. 152°). This oxalic acid salt is converted to the dihydrochloride salt according to the procedure described in Example 1 to give 6.1 g of material, mp 181°–183° (dec.). After recrystallization from 30 ml. of methanol-35 ml. of ether, the pale yellow product weighed 4.6 g., mp 201°–203° (dec.).

EXAMPLE 3

7-Benzylidene-2-[2-(dimethylamino)ethyl]-
3,3a,4,5,6,7-hexahydro-5-methyl-3-phenyl-2H-
pyrazolo[4,3-c]pyridine, hydrochloride (1:2)

A. 7-Benzylidene-3,3a,4,5,6,7-hexahydro-5-methyl-3-phenyl-2H-pyrazolo[4,3-c]pyridine-2-ethanol, hydrochloride (1:2)

A suspension of 10 g (0.0306 mole) of 3,5-dibenzylidene-1-methyl-4-piperidone, hydrochloride in 100 ml of MeOH is treated with 2.35 g (0.031 mole) of (2-hydroxyethyl)hydrazine; a solid rapidly separates. The mixture is heated and the resulting solution is refluxed for 4 hours, cooled, and the bulk of MeOH evaporated to give 12.5 g of a golden yellow foamy residue. The latter is triturated with ether, cooled overnight, filtered, and dried in vacuo; weight 11.6 g; m.p. 100°–102°. A cooled solution of this material in 100 ml of CH$_3$CN is treated with 4.8 ml of 6.4 N ethanolic HCl. On rubbing, the crystalline 2 HCl salt separates. After cooling overnight, the yellow solid is filtered, washed with CH$_3$CN and ether, and dried in vacuo; weight 8.2 g m.p. 135°–137°(foaming). Following crystallization from 70 ml MeOH-150 ml ether, the light yellow material weighs 6.2 g; m.p. 142° –144°(foaming).

B. 7-Benzylidene-3,3a,4,5,6,7-hexahydro-5-methyl-3-phenyl-2H-pyrazolo[4,3-c]pyridine-2-ethanol, tosylate ester, hydrochloride A stirred solution of 16.8 g (0.048 mole) of the free base of the material from Part A in 80 ml of pyridine is cooled to 5° and treated dropwise with a solution of 10 g (0.052 mole) of tosylchloride in 30 ml of pyridine; the temperature remained at 4°–5°. After standing overnight at room temperature, the reddish solution is poured into 1.2 liters of stirred ether to precipitate the product as a gum which becomes granular on rubbing and cooling overnight. The ether liquor is decanted and the material is crystallized from 150 ml of MeCN. The yield of nearly colorless product was 14.7 g (57%); mp 131°–133° (foaming).

C. 7-Benzylidene-2-[2-(dimethylamino)ethyl]-
3,3a,4,5,6,7-hexahydro-5-methyl-3-phenyl-2H-
pyrazolo[4,3-c]pyridine, hydrochloride (1:2)

A stirred suspension of the material from Part B (14.6 g; 0.027 mole) in 350 ml benzene is treated with a cold solution of 50 g of dimethylamine in 200 ml of benzene and kept at room temperature for 4 days. After refluxing for 6 hr., the bulk of benzene is evaporated, the residue is shaken with 250 ml of ether and 125 ml of H$_2$O, basified with excess K$_2$CO$_3$, the layers separated, the aqueous phase extracted with ether (2 × 125 ml), the combined ether layers dried (MgSO$_4$), and the solvent evaporated to give 9.2 g of viscous base. The latter was dissolved in 50 ml of warm MeCN, stirred, and treated with a warm solution of 6.7 g of oxalic acid in 50 ml of MeCN. The oxalate separated as an oil which readily crystallized on rubbing and cooling overnight, wt., 14.5 g; mp 166°–168° (foaming at 180°). Following crystallization from 40 ml of hot DMF- 120 ml MeCN, the cream-colored solid weighed 11.7 g; mp 201°–203°.

The dioxalate salt is stirred with 250 ml of H$_2$O and 125 ml of ether, basified with K$_2$CO$_3$, the layers separated, the aqueous phase extracted with ether (3 × 50 ml), the combined ether layers dried (MgSO$_4$), and the solvent evaporated to give 7.4 g of viscous base. TLC: 1 spot (EtOAc on alumina; R$_f$ 0.60).

A cooled and stirred solution of the base in 75 ml of MeCN is treated with 6.4 ml of 6.2 N alcoholic HCl and diluted to 400 ml with ether. The 2 HCl salt separated as a gum which becomes granular on rubbing. After cooling overnight, the material is filtered under N$_2$, washed with ether, and dried in vacuo; wt., 8.6 g (68%); mp 124°–127° (s.96°). Since attempts to crystallize the product are unsuccessful, it is dissolved in 75 ml of MeCN, filtered, and added portionwise to 700 ml of stirred ether to reprecipitate the light yellow solid. The final yield of slightly hygroscopic material is 8.1 g (64%); mp 132°–135°(s.96°).

EXAMPLES 4–6

2-[3-(Dimethylamino)propyl]-7-heterocyclyidene-
3,3a,4,5,6,7-hexahydro-5-methyl-3-heterocyclic-2H-
pyrazolo[4,3-c]pyridine, hydrochlorides A. 3,5-Disubstituted-1-methyl-4-piperidones According to the procedure of Example 1, upon substituting in place of benzaldehyde, one of the following compounds:
thiophene-2-carboxaldehyde,
pyridine-4-carboxaldehyde, and
thiophene-3-carboxaldehyde;
one obtains:
3,5-bis-(2-thienylidene)-1-methyl-4-piperidone, hydrochloride;
3,5-bis-(4-pyridylidene)-1-methyl-4-piperidone, hydrochloride;
and
3,5-bis-(3-thienylidene)-1-methyl-4-piperidone, hydrochloride,
respectively.

B. 2-[3-(Dimethylamino)propyl]-7-heterocyclyidene-
3,3a,4,5,6,7-hexahydro-5-methyl-3-heterocyclic-2H-
pyrazolo[4,3-c]pyridine, hydrochlorides According to the procedure of Example 1, upon substituting the above compounds, one obtains:

2-[3-(Dimethylamino)propyl]-7-(2-thienylidene)-3-(2-thienyl)-3,3a,4,5,6,7-hexahydro-5-methyl-3-2H-pyrazolo[4,3-c]pyridine, hydrochloride;

2-[3-(Dimethylamino)propyl]-7-(4-pyridylidene)-3,3a,4,5,6,7-hexahydro-5-methyl-3-(4-pyridyl)-2H-pyrazolo[4,3-c]pyridine, hydrochloride; and 2-[3-(Dimethylamino)propyl]-7-(3-thienylidene)-3,3a,4,5,6,7-hexahydro-5-methyl-3-(3-thienyl)-2H-pyrazolo[4,3-c]pyridine, hydrochloride, respectively.

EXAMPLE 7

7-(o-Chlorobenzylidene)-3-(o-chlorophenyl)-2-[3-(dimethylamino)propyl]-3,3a,4,5,6,7-hexahydro-5-methyl-2H-pyrazolo[4,3-c]pyridine, hydrochloride A. 3,5-Bis(o-chlorobenzylidene)-1-methyl-4-piperidone, hydrochloride A mixture of 1-methyl-4-piperidone (22.6 g; 0.2 mole), 85 g (0.6 mole) of o-chlorobenzaldehyde, concentrated HCl (66 ml) and EtOH (300 ml) are refluxed together for 5 hours. After removal of solvent, the crude product weighs 9.3 g (12%), m.p. 218°–220°(-dec). Crystallization from 20 ml of hot DMF and 40 ml of MeCN gives 7.9 g (10%) of yellow solid; m.p. 221°–223°(dec). Lit. m.p. 227°–229°(dec) [JACS, 70, 1825 (1948); different procedure].

B. 7-(o-Chlorobenzylidene)-3-(o-chlorophenyl)-2-[3-(dimethylamino)propyl]-3,3a,4,5,6,7-hexahydro-5-methyl-2H-pyrazolo[4,3-c]pyridine, hydrochloride The above compound (7.7 g; 0.0195 mole) and 2.4 g (0.02 mole) of 3-dimethylaminopropyl hydrazine are reacted in 100 ml of MeOH as described in Example 1. Evaporation of the MeOH yields the product.

EXAMPLES 8–11

2-[3-(Dimethylamino)propyl]-7-(substituted benzylidene)-3-(substituted phenyl)-3,3a,4,5,6,7-hexahydro-5-methyl-2H-pyrazolo[4,3-c]pyridine, hydrochlorides A. 3,5-Di(substituted benzylidene)-1-methyl-4-piperidone, hydrochloride According to the procedure of Example 7, upon substituting in place of o-chlorobenzaldehyde, one of the following compounds:
p-methoxybenzaldehyde,
m-ethylbenzaldehyde,
o-trifluoromethylbenzaldehyde, and
p-fluorobenzaldehyde,
one obtains:
3,5-bis(p-methoxybenzylidene)-1-methyl-4-piperidone, hydrochloride,
3,5-bis(m-ethylbenzylidene)-1-methyl-4-piperidone, hydrochloride,
3,5-bis(o-trifluoromethylbenzylidene)-1-methyl-4-piperidone, hydrochloride, and
3,5-bis(p-fluorobenzylidene)-1-methyl-4-piperidone, respectively.

B. 2-[3-(Dimethylamino)propyl]-7-(substituted benzylidene)-3-(substituted phenyl)-3,3a,4,5,6,7-hexahydro-5-methyl-2H-pyrazolo[4,3-c]pyridine, hydrochlorides According to the procedure of Example 1, upon substituting the above compounds, one obtains:

2-[3-(dimethylamino)propyl]-7-(p-methoxybenzylidene)-3-(p-methoxyphenyl)-3,3a,4,5,6,7-hexahydro-5-methyl-2H-pyrazolo[4,3-c]pyridine, hydrochloride;

2-[3-(dimethylamino)propyl]-7-(m-ethylbenzylidene)-3-(m-ethylphenyl)-3,3a,4,5,6,7-hexahydro-5-methyl-2H-pyrazolo[4,3-c]pyridine, hydrochloride;

2-[3-(dimethylamino)propyl]-7-(o-trifluoromethylbenzylidene)-3-(o-trifluoromethylphenyl)-3,3a,4,5,6,7-hexahydro-5-methyl-2H-pyrazolo[4,3-c]pyridine, hydrochloride; and 2-[3-(dimethylamino)propyl]-7-(p-fluoromethylbenzylidene)-3-(p-fluorophenyl)-3,3a,4,5,6,7-hexahydro-5-methyl-2H-pyrazolo[4,3-c]pyridine, hydrochloride, respectively.

EXAMPLE 12

7-(p-Chlorobenzylidene)-3-(p-chlorophenyl)-2-[3-(dimethylamino)propyl]-3,3a,4,5,6,7-hexahydro-5-methyl-2H-pyrazolo[4,3-c]pyridine, hydrochloride (1:2)

A. 3,5-Bis(p-chlorobenzylidene)-1-methyl-4-piperidone, hydrochloride

1-Methyl-4-piperidone (22.6 g; 0.2 mole) and 85 g (0.6 mole) of p-chlorobenzaldehyde are reacted in 300 ml of EtOH in the presence of 66 ml of concentrated HCl according to Example 7 to give 19 g (24%) of crude product; m.p. 253°–255°(dec). Following crystallization from 120 ml of hot DMF and 240 ml of MeCN, the yellow solid weighs 13.7 g (17%); m.p. 256°–258°(dec).

B. 7-(p-Chlorobenzylidene)-3-(p-chlorophenyl)-2-[3-(dimethylamino)propyl]-3,3a,4,5,6,7-hexahydro-5-methyl-2H-pyrazolo[4,3-c]pyridine, hydrochloride (1:2)

The above material (9 g; 0.023 mole) and 3.0 g (0.025 mole) of 3-dimethylaminopropylhydrazine are reacted in 100 ml of MeOH as described in Example 1 to give the product.

EXAMPLE 13

2-[3-(Dimethylamino)propyl]-3,3a,4,5,6,7-hexahydro-5-methyl-3-(2-pyridyl)-7-(2-pyridylidene)-2H-pyrazolo[4,3-c]pyridine, hydrochloride (1:2)

A. 1-Methyl-3,5-bis-(2-pyridylidene)-4-piperidone

1-Methyl-4-piperidone (11.3 g; 0.1 mole) and pyridine-2-carboxaldehyde (32 g; 0.3 mole) are reacted in 150 ml of EtOH containing 33 ml of concentrated HCl as described in Example 5. The bulk of EtOH is evaporated and the residue is diluted with 100 ml of H$_2$O, washed with ether (2 × 100 ml; washes discarded), cooled, basified with a cold solution of 20 g of NaOH in 60 ml of H$_2$O, extracted with 3:1 ether-CHCl$_3$ (4 × 25 ml), dried (MgSO$_4$), and the solvents evaporated to give 34.7 g of a dark viscous oil.

The material is chromatographed on basic alumina (Woelm Act. IV 25 g/l g). The desired product is eluted with benzene and 90:10 benzene-EtOAc; crude yield 4.0 g (14%); m.p. 134°–137°. Crystallization from 20 ml of MeCN gives 2.4 g (8.3%) of yellow solid; m.p. 146°–148°. Lit. m.p. 147° [Buu-Hoi, et al., Bull. Soc. Chim., 1964, 3096 (different procedure)].

B. 2-[3-(Dimethylamino)propyl]-3,3a,4,5,6,7-hexahydro-5-methyl-3-(2-pyridyl)-7-(2- pyridylidene)-2H-pyrazolo[4,3-c]pyridine, hydrochloride (1:2)

A stirred suspension of the above material (2.4 g; 0.0083 mole) in 30 ml of MeOH is treated with 0.9 ml of 9.5 N alcoholic HCl (1 equiv.) and then reacted with 1.05 g (0.0089 mole) of 3-dimethylaminopropylhydrazine as described in Example 1 to give the product.

EXAMPLES 14-17

2-[3-(Dimethylamino)propyl]-7-(substituted benzylidene)-3-phenyl-3,3a,4,5,6,7-hexahydro-5-methyl-2H-pyrazolo[4,3-c]pyridine, hydrochlorides A. 3-Benzylidene-1-methyl-4-piperidone, hydrochloride(1:1)

A stirred solution of 22.6 g (0.2 mole) of 1-methyl-4-piperidone and 16 g (0.15 mole) of benzaldehyde in 500 ml of EtOH is cooled to 15° and treated portionwise with 66 ml of concentrated HCl; the temperature is not allowed to exceed 25°. After refluxing for 4.5 hours, the bulk of EtOH is evaporated at 1 mm. The residue is diluted to 150 ml with H₂O, cooled, basified with a cold solution of 40 g of NaOH in 120 ml of H₂O, extracted with ether (4 × 200 ml), dried (MgSO₄), and the solvent is evaporated to give 24 g of oil. The latter is redissolved in 300 ml of ether, washed with H₂O (4 × 50 ml), dried and the ether is evaporated. The residue (19 g) is distilled to give 3.9 g of the product as a yellow oil; bp 137°-143°/0.1-0.2 mm.

The base is dissolved in 20 ml of MeCN, cooled, treated with 3.1 ml of 6.3N alcoholic HCl, and diluted to 40 ml with ether. On rubbing and cooling, the crystalline HCl salt gradually separates crude yield 4.1 g (11%) m.p. 148°-151° (s. 135°). Following crystallization from 20 ml of MeCN, the cream-colored material weighs 2.7 g (7.3%); m.p. 150°-152° (s. 138°).

B. 3-Benzylidene-5-substituted-1-methyl-4-piperidone

According to the above procedure of this Example, upon substituting in place of 1-methyl-4-piperidone, the free base of the product of part A above (3-benzylidene-1-methyl-4-piperidone) and upon substituting in place of the benzaldehyde, one of the following compounds:
o-chlorobenzaldehyde,
o-(isopropyl)benzaldehyde,
m-trifluoromethylbenzaldehyde, and
o-methoxybenzaldehyde
one obtains:
3-benzylidene-5-(o-chlorobenzylidene)-1-methyl-4-piperidone hydrochloride,
3-benzylidene-5-(o-isopropyl)benzylidene-1-methyl-4-piperidone hydrochloride,
3-benzylidene-5-m-trifluoromethylbenzylidene-1-methyl-4-piperidone hydrochloride, and
3-benzylidene-5-o-methoxybenzylidene-1-methyl-4-piperidone hydrochloride,
respectively.

C. 2-[3-(Dimethylamino)propyl]-7-(substituted benzylidene)-3-phenyl-3,3a,4,5,6,7-hexahydro-5-methyl-2H-pyrazolo[4,3-c]pyridine, hydrochlorides The above material (0.021 mole) and 3-dimethylaminopropylhydrazine (0.022 mole) are reacted in 100 ml of MeOH as described in Example 1 to give:
7-(o-chlorobenzylidene)-2-[3-(dimethylamino)propyl]-3-phenyl-3,3a,4,5,6,7-hexahydro-5-methyl-2H-pyrazolo[4,3-c]pyridine hydrochloride;
2-[3-(dimethylamino)propyl]-7-(o-isopropylbenzylidene)-3-phenyl-3,3a,4,5,6,7-hexahydro-5-methyl-2H-pyrazolo[4,3-c]pyridine hydrochloride;
2-[3-(dimethylamino)propyl]-7-(m-trifluoromethylbenzylidene)-3-phenyl-3,3a,4,5,6,7-hexahydro-5-methyl-2H-pyrazolo[4,3-c]pyridine hydrochloride; and
2-[3-(dimethylamino)propyl]-7-(o-methoxybenzylidene)-3-phenyl-3,3a,4,5,6,7-hexahydro-5-methyl-2H-pyrazolo[4,3-c]pyridine hydrochloride, respectively.

EXAMPLE 18

7-Benzylidene-5-butyl-3,3a,4,5,6,7-hexahydro-2-[3-(dimethylamino)propyl]-3-phenyl-2H-pyrazolo[4,3-c]pyridine, hydrochloride (1:2), hydrate A. 3,5-Dibenzylidene-1-butyl-4-piperidone, hydrochloride A stirred solution of 31 g (0.2 mole) of 1-butyl-4-piperidone and 64 g (0.6 mole) of benzaldehyde in 300 ml of EtOH is cooled to 15°, treated dropwise with 66 ml of concentrated HCl (the temperature rises to 25°), refluxed for 5 hours, and kept overnight at room temperature.

The bulk of EtOH is evaporated and the syrupy residue is cooled, diluted to 600 ml with H₂O, treated with 300 ml of ether, stirred, and rubbed; a solid gradually separates. After cooling for several hours, the yellow solid is filtered, washed with ether, and air-dried; weight, 36.7 g (50%); m.p. 203°-205°. Following crystallization from 100 ml of DMF, the material weighs 24.2 g (33%); m.p. 212°-214°.

B. 7-Benzylidene-5-butyl-3,3a,4,5,6,7-hexahydro-2-[3-(dimethylamino)propyl]-3-phenyl-2H-pyrazolo[4,3-c]pyridine, hydrochloride (1:2), hydrate The above prepared material (7.7 g; 0.021 mole) and 2.6 g (0.022 mole) of 3-dimethylaminopropylhydrazine are reacted in 100 ml of MeOH as described in Example 1 to give the product.

EXAMPLE 19

5-Benzyl-7-benzylidene-2-[3-(dimethylamino)propyl]-3,3a,4,5,6,7-hexahydro-3-phenyl-2H-pyrazolo[4,3-c]pyridine, hydrochloride (1:2)

A. 1-Benzyl-3,5-dibenzylidene-4-piperidone, hydrochloride

19 Grams (0.1 mole) of 1-benzyl-4-piperidone and 32 g (0.3 mole) of benzaldehyde are reacted in 150 ml of EtOH in the presence of 33 ml of concentrated HCl by the method described in Example 7; crude yield, 23 g (58%); m.p. 210°-212°(dec). Crystallization from 60 ml of hot DMF and 120 ml of MeCN gives 14.2 g (36%) of yellow solid; m.p. 216°-218°(dec).

B. 5-Benzyl-7-benzylidene-2-[3-(dimethylamino)propyl]-3,3a,4,5,6,7-hexahydro-3-phenyl-2H-pyrazolo[4,3-c]pyridine, hydrochloride (1:2)

The above prepared material (12 g; 0.030 mole) and 3.8 g (0.032 mole) of 3-dimethylaminopropylhydrazine are reacted in 100 ml of MeOH as described in Example 1 to give the product.

EXAMPLE 20

5-Acetyl-7-benzylidene-2-[3-(dimethylamino)propyl]-3,3a,4,5,6,7-hexahydro-3-phenyl-2H-pyrazolo[4,3-c]pyridine, hydrochloride (1:1)

A. 1-Acetyl-3,5-dibenzylidene-4-piperidone

A stirred solution of 14 g (0.1 mole) of N-acetyl-4-piperidone and 23 g (0.22 mole) of benzaldehyde in 60 ml of $Ac_2O$ is treated with 30 ml of $NEt_3$, refluxed for 6 hours, and kept overnight at room temperature.

The red-amber solution is poured into 400 ml of ice water, stirred 2 hours and the heavy oil extracted with ether (3 × 200 ml). The combined extracts are washed with $H_2O$ (3 × 100 ml), dried ($MgSO_4$), and the solvent evaporated to give 24.9 g of oil. This material is triturated with 200 ml of isopropyl ether and cooled overnight to give 12.5 g of a yellow gummy product. Following crystallization from 60 ml of i-PrOH, 2.7 g (8.5%) of yellow solid is obtained; m.p. 136°–138°.

B. 5-Acetyl-7-benzylidene-2-[3-(dimethylamino)propyl]-3,3a,4,5,6,7-hexahydro-3-phenyl-2H-pyrazolo[4,3-c]pyridine, hydrochloride (1:1)

A stirred suspension of the above mentioned material (2.7 g; 0.0085 mole) in 30 ml of MeOH is treated with 1.02 g (0.0087 mole) of 3-dimethylaminopropylhydrazine according to the procedure described in Example 1 to give the product.

EXAMPLES 21–26

2Aminoalkyl-7-substituted-3,3a,4,5,6,7-hexahydro-3-substituted 2H-pyrazolo[4,3-c]pyridine, hydrochlorides According to the procedure of Example 1, upon substituting in place of 3-dimethylaminopropylhydrazine, one of the following compounds:
3-diethylaminopropylhydrazine,
2-pyrrolidinoethylhydrazine,
3-piperidinopropylhydrazine,
4-morpholinobutylhydrazine,
2-(4-methylpiperazino)ethylhydrazine, and
3-[4-(2-hydroxyethyl)piperazino]propylhydrazine,
one obtains:
7-benzylidene-2-[3-(diethylamino)propyl]-3,3a,4,5,6,7-hexahydro-5-methyl-3-phenyl-2H-pyrazolo[4,3-c]pyridine hydrochloride (1:2),
7-benzylidene-3,3a,4,5,6,7-hexahydro-5-methyl-3-phenyl-2-[2-(pyrrolidino)ethyl]-2H-pyrazolo[4,3-c]pyridine hydrochloride (1:2);
7-benzylidene-3,3a,4,5,6,7-hexahydro-5-methyl-3-phenyl-2-[3-(piperidino)propyl]-2H-pyrazolo[4,3-c]pyridine, hydrochloride (1:2);
7-benzylidene-3,3a,4,5,6,7-hexahydro-5-methyl-2-[4-(morpholino)butyl]-3-phenyl-2H-pyrazolo]4,3c]pyridine, hydrochloride (1:2);
7-benzylidene-3,3a,4,5,6,7-hexahydro-5-methyl-2-[2-(4-methylpiperazino)ethyl]-3-phenyl-2H-pyrazolo[4,3-c]pyridine, hydrochloride (1:2);
7-benzylidene-3,3a,4,5,6,7-hexahydro-2-[3-[4-(2-hydroxyethyl)-piperazino]propyl]-5-methyl-3-phenyl-2H-pyrazolo[4,3-c]pyridine, hydrochloride (1:2), respectively.

EXAMPLE 27

7-Benzylidene-3,3a,4,5,6,7-hexahydro-5-methyl-2-[2-(4-morpholinyl)ethyl]-3-phenyl-2H-pyrazolo[4,3-c]pyridine, hydrochloride (1:2)

7-Benzylidene-3,3a,4,5,6,7-hexahydro-5-methyl-3-phenyl-2H-pyrazolo[4,3-c]pyridine-2-ethanol, tosylate ester, HCl (9.5 g; 0.018 mole) from Example 3 Part B, is reacted with 15 g (0.17 mole) of morpholine in 350 ml of benzene (stands at room temperature overnight, then refluxed 6 hrs.) to give 6.8 g of light yellow, almost glasslike base. The latter is dissolved in 45 ml of warm MeCN, cooled, and treated with 5.4 ml of 6.0 N alcoholic HCl. On rubbing, the crystalline dihydrochloride salt separates. After cooling overnight, the material is filtered under $N_2$, washed with cold MeCN and ether, and dried in vacuo; wt., 6.8 g (78%); mp 195°–197° (dec.). Following crystallization from 50 ml MeOH-100 ml ether, the colorless, slightly hygroscopic, product weighs 6.3 g (73%); mp 204°–206° (dec.).

EXAMPLE 28

7-Benzylidene-2-[3-(dimethylamino)propyl]-3,3a,4,5,6,7-hexahydro-5-methyl-3-phenyl-2H-pyrazolo[4,3-c]pyridine, N-oxide, hydrochloride (1:2)

A solution of the free base from Example 1 in acetic acid is treated with an equivalent quantity of 30% hydrogen peroxide and the solution then heated at 80°–90° for 1 hour and cooled. The solvent is removed on a rotary evaporator at reduced pressure. The residue is dissolved in chloroform and treated with two equivalents of hydrogen chloride. Evaporation of the solvent yields the product.

EXAMPLE 29

Preparation of capsule formulation

| Ingredient | Milligrams per Capsule |
|---|---|
| 7-Benzylidene-2-[3(dimethylamino)-propyl]-3,3a,4,5,6,7-hexahydro-5-methyl-3-phenyl-2H-pyrazolo[4,3-c]-pyridine, dihydrochloride (1:2) | 200 |
| Starch | 80 |
| Magnesium stearate | 5 |

The active ingredient, starch and magnesium stearate are blended together. The mixture is used to fill hard shell capsules of a suitable size at a fill weight of 485 milligrams per capsule.

EXAMPLE 30

Preparation of tablet formulation

| Ingredient | Milligrams per Tablet |
|---|---|
| 7-Benzylidene-2-[2-(dimethylamino)-ethyl]-3,3a,4,5,6,7-hexahydro-5-methyl-3-phenyl-2H-pyrazolo[4,3-c]pyridine, hydrochloride | 50 |
| Lactose | 250 |
| Corn starch (for mix) | 75 |
| Corn starch (for paste) | 75 |
| Magnesium stearate | 8 |

The active ingredient, lactose and corn starch (for mix) are blended together. The corn starch (for paste) is suspended in water at a ratio of 10 grams of corn starch per 80 milliliters of water and heated with stirring to form a paste. This paste is then used to granulate the mixed powders. The wet granules are passed through a No. 8 screen and dried at 120°F. The dry granules are passed through a No. 16 screen. The mixtue is lubricated with magnesium stearate and compressed into tablets in a suitable tableting machine. Each tablet contains 300 milligrams of active ingredient.

EXAMPLE 31

| Preparation of oral syrup formulation | |
|---|---|
| Ingredient | Amount |
| 7-Benzylidene-2-[3-(dimethylamino)-propyl]-3,3a,4,5,6,7-hexahydro-3-phenyl-2H-pyrazolo[4,3-c]pyridine, dihydrochloride (1:2) | 500 mg |
| Sorbitol solution (70% N.F.) | 40 ml |
| Sodium benzoate | 150 mg |
| Saccharin | 10 mg |
| Red Dye (F.D. & C. No. 2) | 10 mg |
| Cherry flavor | 50 mg |
| Distilled water qs to | 100 ml |

The sorbitol solution is added to 40 milliliters of distilled water and the active ingredient is suspended therein. The saccharin, sodium benzoate, flavor and dye are added and dissolved in the above solution. The volume is adjusted to 100 milliliters with distilled water.

Other ingredients may replace those listed in the above formulation. For example, a suspending agent such as bentonite magma, tragacanth, carboxymethylcellulose or methylcellulose may be used. Phosphates, citrates or tartrates may be added as buffers. Preservatives may include the parabens, sorbic acid and the like and other flavors and dyes may be used in place of those listed above.

What is claimed is:

1. A compound of the formula

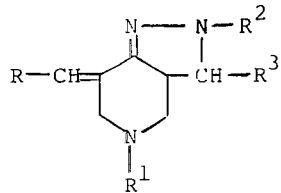

wherein R and $R^3$ are selected from the group consisting of

 

and

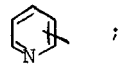 ;

X and $X^1$ are selected from the group consisting of hydrogen, chloro, fluoro, lower alkyl, lower alkoxy and trifluoromethyl; $R^1$ is selected from the group consisting of hydrogen, lower alkyl,

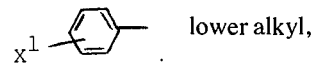 lower alkyl, hydroxy lower alkyl and lower alkanoyl; $R^2$ is B- lower alkyl wherein B is di-lower alkylamino, lower alkyl amino, piperidino, pyrrolidino, morpholine, N-lower alkyl piperazino and N-(2-hydroxyethyl)piperazino; and N-oxides and acid-addition salts thereof.

2. The compounds of claim 1 wherein R and $R^3$ are phenyl, X is hydrogen, $R^1$ is hydrogen or lower alkyl and $R^2$ is dimethylaminopropyl and N-oxides and acid-addition salts thereof.

3. The compound of claim 2 having the name 7-benzylidene-2-[3-(dimethylamino)propyl]-3,3a,4,5,6,7-hexahydro-5-methyl-3-phenyl-2H-pyrazolo[4,3-c]pyridine, dihydrochloride.

4. The compound of claim 2 having the name 7-benzylidene-2-[3-(dimethylamino)propyl]-3,3a,4,5,6,7-hexahydro-3-phenyl-2H-pyrazolo[4,3-c]pyridine, dihydrochloride.

5. The compound of claim 1 having the name 7-benzylidene-2-[2-(dimethylamino)ethyl]-3,3a,4,5,6,7-hexahydro-5-methyl-3-phenyl-2H-pyrazolo[4,3-c]pyridine, dihydrochloride.

6. The compound of claim 1 having the name 7-benzylidene-3,3a,4,5,6,7-hexahydro-5-methyl-2-[2-(4-morpholinyl)ethyl]-3-phenyl-2H-pyrazolo[4,3-c]pyridine, dihydrochloride.

* * * * *

UNITED STATES PATENT AND TRADEMARK OFFICE
CERTIFICATE OF CORRECTION

PATENT NO. : 3,897,420
DATED : July 29, 1975
INVENTOR(S) : John Krapcho et al.

It is certified that error appears in the above-identified patent and that said Letters Patent are hereby corrected as shown below:

Col. 3, line 53, "aliginic" should read --alginic--.

Col. 6, line 18, "was dissolved" should read --is dissolved--.

Col. 11, in the title of examples 21 to 26, "2Aminoalkyl" should read --2-Aminoalkyl--.

Signed and Sealed this seventh Day of October 1975

[SEAL]

Attest:

RUTH C. MASON
Attesting Officer

C. MARSHALL DANN
Commissioner of Patents and Trademarks